(12) United States Patent
Wallmeier et al.

(10) Patent No.: US 11,869,285 B2
(45) Date of Patent: Jan. 9, 2024

(54) AXLE-MONITORING SYSTEM OF A CHASSIS OF A UTILITY VEHICLE AND USE OF AN AXLE-MONITORING SYSTEM

(71) Applicant: SAF-HOLLAND GmbH, Bessenbach (DE)

(72) Inventors: Stefan Wallmeier, Goldbach (DE); Michael Roos, Marktheidenfeld (DE)

(73) Assignee: SAF-Holland GmbH

( * ) Notice: Subject to any disclaimer, the term of this patent is extended or adjusted under 35 U.S.C. 154(b) by 899 days.

(21) Appl. No.: 16/606,553

(22) PCT Filed: Apr. 19, 2018

(86) PCT No.: PCT/EP2018/060047
§ 371 (c)(1),
(2) Date: Oct. 18, 2019

(87) PCT Pub. No.: WO2018/193037
PCT Pub. Date: Oct. 25, 2018

(65) Prior Publication Data
US 2020/0134938 A1    Apr. 30, 2020

(30) Foreign Application Priority Data

Apr. 20, 2017 (DE) ...................... 10 2017 108 363.4

(51) Int. Cl.
*G07C 5/06* (2006.01)
*G01M 17/007* (2006.01)

(52) U.S. Cl.
CPC ............. *G07C 5/06* (2013.01); *G01M 17/007* (2013.01)

(58) Field of Classification Search
CPC .. G07C 5/00; G07C 5/02; G07C 5/06; G01M 17/00; G01M 17/007
See application file for complete search history.

(56) References Cited

U.S. PATENT DOCUMENTS

| 4,086,576 | A | * | 4/1978 | Jebb | ...................... | G01G 3/1406 340/440 |
| 5,959,365 | A | * | 9/1999 | Mantini | .............. | B60C 23/0408 180/290 |
| 6,286,992 | B1 | * | 9/2001 | Kyrtsos | .................... | B61K 9/06 374/45 |

(Continued)

FOREIGN PATENT DOCUMENTS

| DE | 2553350 | 8/1976 |
| DE | 10223190 | 1/2003 |

(Continued)

OTHER PUBLICATIONS

U.S. Appl. No. 62/350,672, filed Jun. 15, 2016 (Year: 2016).*

(Continued)

*Primary Examiner* — Thomas E Worden
(74) *Attorney, Agent, or Firm* — Price Heneveld LLP

(57) ABSTRACT

The present invention relates to an axle-monitoring system of a chassis of a utility vehicle for acquiring data on at least one axle of the chassis, wherein at least one sensor for acquiring at least one physical variable is arranged on the at least one axle, wherein the at least one sensor is configured to acquire a multiplicity of different physical variables, and to the use of an axle-monitoring system.

19 Claims, 1 Drawing Sheet

(56) References Cited

U.S. PATENT DOCUMENTS

| | | | | |
|---|---|---|---|---|
| 6,578,648 | B2* | 6/2003 | Bell | B60C 23/061 |
| | | | | 180/197 |
| 6,874,376 | B2* | 4/2005 | Mattmann | G01L 1/2287 |
| | | | | 73/862.045 |
| 8,935,054 | B2* | 1/2015 | Mantini | B60G 17/04 |
| | | | | 280/81.6 |
| 2002/0036830 | A1* | 3/2002 | Schofield | B60R 1/04 |
| | | | | 348/E7.086 |
| 2002/0196136 | A1* | 12/2002 | Gagnon | B60C 23/06 |
| | | | | 701/31.4 |
| 2003/0051933 | A1* | 3/2003 | Bell | B60C 23/061 |
| | | | | 180/170 |
| 2003/0191564 | A1* | 10/2003 | Haugse | G05B 23/0283 |
| | | | | 340/945 |
| 2005/0248448 | A1* | 11/2005 | Gronau | B60C 23/0416 |
| | | | | 73/146 |
| 2007/0230270 | A1* | 10/2007 | Calhoun | G01S 5/22 |
| | | | | 707/999.001 |
| 2008/0084289 | A1* | 4/2008 | White | B61K 9/04 |
| | | | | 374/E13.01 |
| 2009/0109012 | A1* | 4/2009 | Petrucelli | G01L 17/00 |
| | | | | 340/445 |
| 2014/0238146 | A1* | 8/2014 | Khatavkar | G01L 1/04 |
| | | | | 73/856 |
| 2017/0096115 | A1* | 4/2017 | Delp | F16N 39/02 |

FOREIGN PATENT DOCUMENTS

| | | | |
|---|---|---|---|
| DE | 60313698 | | 1/2008 |
| DE | 102009020428 | | 5/2010 |
| EP | 0307634 | | 3/1989 |
| EP | 3242118 | | 11/2017 |
| WO | 2004022406 | | 3/2004 |
| WO | 2017191313 | | 11/2017 |
| WO | WO-2017196821 A1 * | 11/2017 | ......... B62D 15/0215 |

OTHER PUBLICATIONS

U.S. Appl. No. 62/333,589, filed May 9, 2016 (Year: 2016).*
U.S. Appl. No. 62/427,141, filed Nov. 28, 2016 (Year: 2016).*
U.S. Appl. No. 62/412,843, filed Oct. 26, 2016 (Year: 2016).*
European Patent Office; International Search Report; dated Jul. 3, 2018.

* cited by examiner

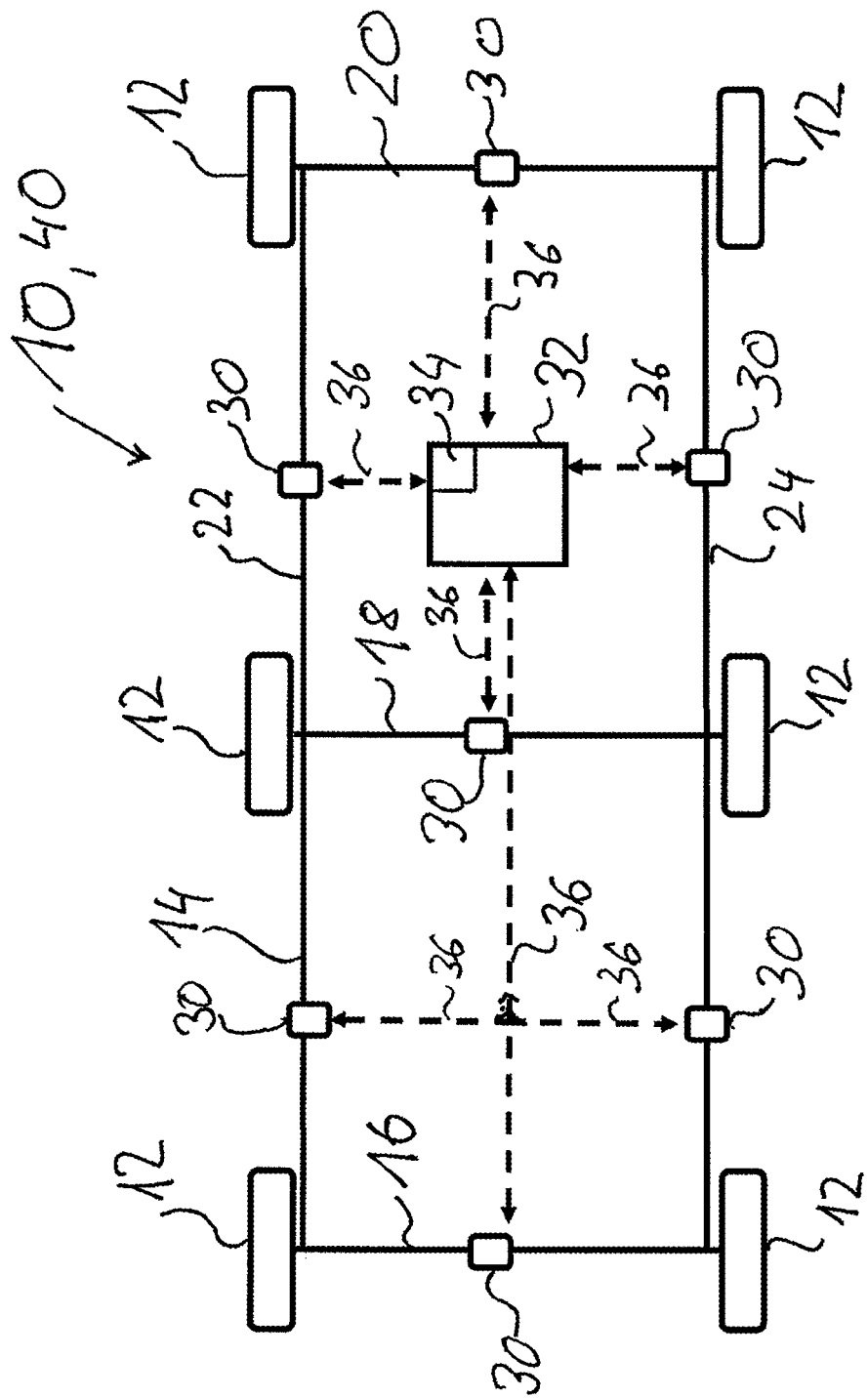

AXLE-MONITORING SYSTEM OF A CHASSIS OF A UTILITY VEHICLE AND USE OF AN AXLE-MONITORING SYSTEM

BACKGROUND OF THE INVENTION

The present invention relates to an axle-monitoring system of a chassis of a utility vehicle, in particular of a chassis of a truck, and to the use of an axle-monitoring system.

The axles of a truck, in particular the chassis systems of a truck, experience a large number of different loads in the course of their lifetime. These loads influence the service life of these axles to a considerable extent. In particular, precise knowledge about the actual loads are of decisive significance for the design of such axles. For example, the axles of the chassis of a utility vehicle experience different loads when travelling along different types of terrain. The actual load of an axle of a chassis of a utility vehicle therefore depends on the underlying surface being travelled on, the type of vehicle itself, the respective cargo of the utility vehicle, the tires of the utility vehicle as well as the environmental conditions such as the temperature or the moisture or the like. In addition, the expected service life of a chassis system of a utility vehicle is also determined by the driving style of a driver or the driving maneuvers which are carried out with the utility vehicle. Depending on the actual loads which a utility vehicle is subjected to in a situation, the axles of the chassis system therefore experience different loads. As already indicated, these include not only forces and torques but also temperature influences, stone chipping or moisture or the like. Damage to a chassis system in the course of the lifetime of the chassis system therefore depends to a very great extent on the respective load but also on the interaction between individual loads. For example, increased one-side loading of the axles causes superimposed bending torques and torsional torques which have to be taken into account in the design. Likewise, superimposed corrosive loads are also significant. This loading gives rise specifically to significantly shorter service lives of the components. An example is the case of stress crack corrosion. For a design which is compatible with lightweight design and in particular compatible with a particular application it is therefore necessary to acquire the actual loads acting on the axles of the chassis system and document and evaluate them.

From the prior art it is known to carry out individual tests in order to make available load data for the design of the axles. Test data are also acquired for this purpose by means of costly measuring methods in individual situations and are transmitted in a test program or the chassis system is qualified on a test bench which is intended to simulate the load cases in the time lapse. This procedure ensures that the axles remain capable of being used with the determined loads over the planned product service life. These test conditions which are taken into account in the design of the axles can, however, only provide an excerpt from the various different loads. In other words, not all the conceivable application cases are acquired. Therefore, the axles of the chassis system can be used only within the scope of the tested conditions without further investigations or the design of the axles requires additional safety means, which gives rise to a greater use of material and therefore to a greater weight.

In addition, there are already first applications which permit data to be acquired and used while the chassis system of a utility vehicle is operating. For example, U.S. Pat. No. 4,086,576 discloses monitoring the axle load by monitoring the sag. When a predefined sag is exceeded, it is necessary to take a measure such as, for example, lowering an additional axle.

U.S. Pat. No. 6,578,648 additionally takes into account the tire pressure. In contrast, U.S. Pat. No. 6,286,992 B1 discloses acquiring temperatures at the axle in order to determine whether the axle has been damaged.

EP 0 307 634 A1 relates to a device and to an axle body for measuring, recording and displaying important operational data of a trailer axle. Load sensors are arranged on both sides of the axle body, between the spring support and the brake bridge, while temperature sensors are arranged in the axle stubs.

DE 10 2009 020 428 A relates to an apparatus and to a method for measuring devices and/or test devices for a rail vehicle. The apparatus is coupled to a shaft or to the shaft and comprises sensors and evaluation units.

WO 2004 022 406 A1 relates to a method and to an apparatus for monitoring the state of chassis of rail vehicles. A wide variety of different sensors are arranged at various locations on the rail vehicle.

DE 603 13 698 T2 relates to vehicle warning systems and makes available a system and a method for collecting vehicle state information in a non-intrusive manner for the analysis of damage and use. Different sensors are accommodated here in the vehicle in different concealed regions.

WO 2017 191 313 A1 relates to an axle-monitoring system of a vehicle. Various sensors are mounted at various locations on the chassis system here.

However, the solutions which are known from the prior art do not permit a complete overview over the loads and the status of the chassis system to be determined and recorded over a relatively long time period.

It is therefore an object of the present invention to make available an axle-monitoring system of a chassis of a utility vehicle which determines and records a complete overview over the actual loads and the status of the chassis system over a relatively long time period.

SUMMARY OF THE INVENTION

According to the invention, the axle-monitoring system of a chassis of a utility vehicle, in particular of a chassis of a truck or trailer, comprises, for acquiring data on at least one axle of the chassis, at least one sensor for acquiring at least one physical variable on the at least one axle, wherein the at least one sensor is arranged on the at least one axle. According to the proposal, the at least one sensor is configured to acquire a multiplicity of different physical variables. The at least one sensor can be embodied, for example, as an array on which different sensors, such as for example a pressure sensor, a temperature sensor, a torque sensor or the like, are arranged. A multiplicity of different physical variables are preferably acquired simultaneously or in succession. This has the advantage that not only individual measurement variables are acquired but also a multiplicity of measurement variables which permit an overview which is as complete as possible to be obtained over the cases of use of the axles of a chassis. In particular, by acquiring the physical variables it is possible to determine a relationship between the physical variables so that the influence of the service life of the axles can be represented on the basis of the different physical variables.

The at least one sensor is preferably configured to acquire the multiplicity of different physical variables simultaneously and/or successively. This has the advantage that different physical variables can be acquired in a chronology, as a result of which the actual axle loads can be recorded in the course of time and as a result of which relationships between the physical variables can be determined.

More preferably the at least one sensor is configured to acquire the multiplicity of different physical variables continuously or at predefined points in time. Depending on the corresponding influence of the respective load it is possible to acquire the associated physical variable, for example, continuously, while as a result of a load which has a small influence on the service life of the chassis axles are preferably acquired at specified points in time. This has the advantage that the loads are acquired with corresponding frequency ordered according to their relevance. An overview over the loads and the status of the chassis can also be recorded and monitored in a more targeted fashion.

The multiplicity of different physical variables particularly preferably comprises at least the acquisition of one of the following physical variables:
  acquiring a temperature of the axle,
  acquiring a material stress of the axle,
  acquiring a pressure which is present at the axle,
  acquiring an oscillation which has occurred at the axle,
  acquiring a speed with which the axle is moving,
  acquiring a positive or a negative acceleration with which the axle is accelerated or braked,
  acquiring location data by means of GPS,
  acquiring moisture on or around the axle,
  acquiring an air pressure at the axle,
  acquiring a roadway route, in particular a negative gradient of a roadway or a type of roadway,
  acquiring material changes of the axle, in particular an electrical resistance,
  acquiring distances or positions of the axle with respect to a roadway or with respect to another axle, and/or
  acquiring corrosion on the axle.

It is consequently proposed to acquire a sensor spectrum which acquires and correspondingly records the different loads under different environmental conditions. The different physical acquired variables are preferably passed on to a control unit which is configured to evaluate the different acquired physical variables and expediently represent them on a monitor. In particular, the acquired physical variables are plotted with respect to one another in a diagram, as a result of which further relationships between the physical variables can be determined.

According to one embodiment of the present invention, a plurality of sensors for acquiring the different physical variables are arranged on the at least one axle. It is consequently conceivable additionally to arrange further sensors on the at least one axle to form an array on which a plurality of sensors are arranged, so as to be able to determine a sensor spectrum which is as complete as possible for different physical variables with respect to an axle. The arrangement of the sensors on the chassis and the sensors which are used can consequently be adapted to the corresponding purpose of the measurement.

The at least one sensor or the plurality of sensors is/are preferably arranged and configured in such a way that the different physical variables are acquired at various locations on the chassis or at a central location on the chassis. When the different physical variables are acquired at various locations on the chassis, it is possible, for example, to document an axle-dependent loading and evaluate it in an axle-dependent fashion. Consequently, the loads can be represented with spatial resolution by virtue of the possibility of axle-dependent evaluation of the load.

The axle-monitoring system preferably also comprises a controller for data evaluation and/or passing on data and/or a memory for storing the acquired physical data. The controller is preferably connected to a monitor on which the evaluated data can be displayed to a user. In addition, the acquired physical data which are stored in the memory can be overwritten and/or read out. In addition, specified standards of the respective physical variables can be stored in the memory or in the controller.

The controller is more preferably also configured to output a fault message if an evaluation of the acquired physical variable reveals that at least one parameter, acquired, in particular, at an axle, of a physical variable deviates from a specified standard which is stored, in particular, in the memory or the controller. When this acquired parameter of a physical variable deviates from a specified standard stored in the controller, this can be correspondingly displayed to a user on a monitor. Subsequently, corresponding measures can be carried out in order to counteract the deviation of the acquired parameter of the physical variable from the specific standard. This improves the service life of the chassis.

The axle-monitoring system preferably also comprises an access-securing unit, in order to limit access to the acquired physical data to selected persons or selected external systems. The access securing unit can be embodied, for example, as an interface or the like. The access securing unit can also be embodied as a Bluetooth interface or as a WLAN interface or the like. The acquired physical data can be read out from selected external systems via the access securing unit. The selected external systems can be, for example, a computer (PDA) or a smartphone or the like. The access securing unit is preferably password-protected. This has the advantage that the access to acquired physical variables is limited to selected persons or selected external systems. This can avoid misuse of data.

The acquired physical data are preferably stored, in defined groups, in particular clustered, in order to bring about a reduction in the data volume. This provides the necessary physical data to be acquired in a long-term measurement, said data being stored in groups. This ensures that when a specific physical variable is interrogated, it can be presented quickly and easily in a chronology. In addition, physical variables of different groups can be represented in a chronologically superimposed fashion. As a result, for example relationships can be represented for different loads. This permits a more detailed representation of the loads. An acquired physical variable is preferably evaluated and processed with respect to an axle at which the physical variable is acquired, or is evaluated and processed with respect to all the axles of the chassis jointly. This permits the loads to be represented with spatial resolution in the chassis system. In the case of corresponding deviations of the acquired physical variables from the specified stored standard in the controller it is consequently possible to implement a measure for the corresponding axle for counteracting the axle load.

Each axle preferably has an axle identifier to which the acquired physical variables can be linked or to which the axles in the chassis of the utility vehicle can be linked, in order to document the continuous history of the individual axles in the chassis. An axle identifier can be arranged here as a barcode, QR code, RFID chip or as an identification number on the respective axle. It is also conceivable to embody the axle identifier as a computer code which is stored on the axle. A computer code would have the advantage that the axle identifier could be read by the selected external systems. In addition, the axle identifier permits the acquired physical variables to be represented with spatial resolution.

The axle-monitoring system is preferably embodied as an autonomously operating unit which is assigned to a chassis system of a utility vehicle, or wherein the axle-monitoring system has various components which are assigned at least partially to a tractor machine of the utility vehicle or are integrated in a tractor machine of the utility vehicle. Data systems or supply systems of the axle-monitoring system can preferably be integrated in the tractor machine. However it is also conceivable that the data systems or supply systems of the axle-monitoring system are embodied independently of the data system or supply system of the utility vehicle. In particular, the axle-monitoring system can be tailored to a user.

The axle-monitoring system is particularly preferably connected to a warning system which outputs a warning message after a deviation of an acquired parameter of an acquired physical variable from setpoint values which are stored, in particular, in the controller, is detected. The warning message can be output, for example, on a monitor which is or can be connected to the controller. By outputting a warning message, it is possible to quickly counteract the load of an axle by implementing corresponding measures for relieving the loading on the corresponding axle.

The axle-monitoring system can preferably also be mounted on a trailer which is or can be connected to the utility vehicle. The proposed axle monitoring system can consequently be mounted not only on a utility vehicle itself but also on a trailer which is connected to the utility vehicle, in order also to monitor the axles of the trailer. As a result, all the axles of the utility vehicle, as well as those of the trailer, can be monitored collectively. If appropriate, a detected incorrect load of the axles of the trailer can as a result be quickly eliminated.

A further aspect of the present invention relates to the use of an axle-monitoring system such as has been described above. The axle-monitoring system is used for maintenance, in order to display a prediction about at least partial wear and/or, if appropriate, necessary replacement of components of the chassis and/or of the trailer. By using the axle-monitoring system for maintenance it is possible to increase the expected service life of the chassis system and/or of the trailer.

BRIEF DESCRIPTION OF THE DRAWINGS

Further advantages and features of the present invention emerge from the following description of preferred embodiments with reference to the appended FIGURE. Of course, individual embodiments which are shown in the FIGURE can have features which can also be used in other embodiments even if this is not explicitly stated and insofar as this is not ruled out owing to technical conditions or explicitly. In the drawings:

FIG. 1 is a schematic plan view of an axle-monitoring system of a chassis of a utility vehicle.

DETAILED DESCRIPTION OF THE PREFERRED EMBODIMENTS

FIG. 1 shows a schematic plan view of a utility vehicle 10. The utility vehicle 10 has tires 12 which are in contact with a roadway (not illustrated). The utility vehicle 10 has a chassis 14 with the axles 16, 18, 20, 22, 24. A plurality of sensors 30 are arranged on the various axles 16-24. The sensors 30 can be designed to acquire different physical variables. The sensors 30 can be designed to acquire a temperature at the axle, a material stress at the axle, a pressure which is present at the axle or to acquire a speed with which the axle is being moved, in particular relative to the roadway, whether it is a constant speed or a positive or negative acceleration. In addition, the sensors 30 can be designed to determine location data by means of GPS. It is also conceivable that the sensors 30 are designed to acquire moisture on or around at least one of the axles 16-24, to acquire an air pressure at one of the axles 16-24 or to acquire a change in material of one of the axles 16-24, in particular by measuring an electrical resistance. A change in material could be, for example, the formation of corrosion on and/or expansion and/or compression of at least one of the axles 16-24. In addition, at least one of the sensors 30 could serve to acquire the roadway route, in particular to acquire a negative gradient of the roadway or a type of the roadway, such as for example, the acquisition of asphalt or the acquisition of an underlying surface which is covered with pebbles or the like. In addition it is conceivable that at least one of the sensors 30 is designed to acquire corrosion on one of the axles 16-24 or to acquire distances between an axle 16-24 and the roadway or from another axle 16-24. In FIG. 1, a sensor 30 is represented on each of the axles 16-24. However, it is also conceivable that at least one sensor 30 or else a plurality of sensors 30 are arranged on only selected axles 16-24. The at least one sensor 30 or the plurality of sensors 30 communicates/communicate with a controller 32. The controller 32 is configured to evaluate and/or pass on the acquired physical data. The controller 32 also comprises a memory 34 in which the acquired physical data can be stored or in which specified standard value of the parameters which are to be acquired for a physical variable are stored. The controller 32 can communicate with selected external systems (not illustrated). The axle-monitoring system 40 comprises for this purpose an access securing unit in the form of, for example, an interface, in particular a password-protected interface. Each of the sensors 30 can preferably communicate with the control unit 32, which is indicated by the double arrows 36.

LIST OF REFERENCE NUMBERS

10 Utility vehicle
12 Tire
14 Chassis
16-24 Axle
30 Sensor
32 Controller
34 Memory
36 Communication direction
40 Axle-monitoring system

The invention claimed is:

1. An axle-monitoring system of a chassis of a utility vehicle or of a trailer to be pulled by the utility vehicle, the system configured to acquire data on at least one axle of the chassis, the system comprising:
a plurality of sensors configured to acquire a multiplicity of different physical variables are arranged on the at least one axle;
a memory for storing the acquired multiplicity of different physical variables; and
an access-securing interface coupled to the memory and configured to limit access to the acquired multiplicity of different physical variables to selected persons or selected external systems;

wherein, in order to reduce data volume, the acquired multiplicity of different physical variables are stored in clustered groups; and wherein the multiplicity of different physical variables comprises at least the following physical variables: a temperature of the at least one axle, a material stress of the at least one axle, material changes of the at least one axle based on changes in electrical resistance, and a speed at which the at least one axle is moving.

2. The axle-monitoring system as defined in claim 1, where at least one of the plurality of sensors is configured to acquire the multiplicity of different physical variables successively.

3. The axle-monitoring system as defined in claim 1, where at least one of the plurality of sensors is configured to acquire the multiplicity of different physical variables continuously.

4. The axle-monitoring system as defined in claim 1, where at least one of the plurality of sensors is configured to acquire the multiplicity of different physical variables at predefined points in time.

5. The axle-monitoring system as claimed in claim 1, wherein the multiplicity of different physical variables comprises at least one of the following physical variables: a pressure which is present at the at least one axle, an oscillation which has occurred at the at least one axle, a positive or a negative acceleration with which the at least one axle is accelerated or braked, location data acquired by means of a global positioning system, moisture data on or around the at least one axle, an air pressure at the at least one axle, a route of a roadway, in particular a negative gradient of the roadway or a type of the roadway, distances or positions of the at least one axle with respect to the roadway or with respect to another axle, and/or acquiring corrosion on the at least one axle.

6. The axle-monitoring system as claimed in claim 5, wherein the plurality of sensors are arranged and configured in such a way that the multiplicity of different physical variables are acquired at various locations on the chassis.

7. The axle-monitoring system as claimed in claim 6, further comprising:
a controller in communication with the plurality of sensors and the memory, wherein the controller is configured to evaluate or pass on data received from the plurality of sensors.

8. The axle-monitoring system as claimed in claim 7, wherein the controller is configured to output a fault message if an evaluation of one of the acquired multiplicity of different physical variables reveals that at least one parameter, acquired relative to the at least one axle, of the one of the acquired multiplicity of different physical variables deviates from a specified standard.

9. The axle-monitoring system as claimed in claim 1, wherein the at least one axle has an axle identifier to which the acquired multiplicity of different physical variables can be linked or to which the at least one axle of the chassis can be linked, in order to document a continuous history of the at least one axle of the chassis within the memory.

10. The axle-monitoring system as claimed in claim 9, wherein the controller is connected to a monitor, which displays a warning message after a deviation of a parameter of one of the acquired multiplicity of different physical variables from setpoint values stored in the controller is detected.

11. The axle-monitoring system as claimed in claim 10, wherein the axle-monitoring system is mounted on the trailer to be pulled by the utility vehicle.

12. The axle-monitoring system as claimed in claim 1, wherein the plurality of sensors are arranged and configured in such a way that the multiplicity of different physical variables are acquired at various locations on the chassis.

13. The axle-monitoring system as claimed in claim 1, further comprising:
a controller in communication with the plurality of sensors and the memory, wherein the controller is configured to evaluate or pass on data received from the plurality of sensors.

14. The axle-monitoring system as claimed in claim 13, wherein the controller is configured to output a fault message if an evaluation of one of the acquired multiplicity of physical variables reveals that at least one parameter, acquired relative to the at least one axle, of the one of the multiplicity of different physical variables deviates from a specified standard.

15. The axle-monitoring system as claimed in claim 1, wherein the at least one axle has an axle identifier to which the acquired multiplicity of different physical variables can be linked or to which the at least one axle of the chassis can be linked, in order to document a continuous history of the at least one axle of the chassis within the memory.

16. The axle-monitoring system as claimed in claim 1, further comprising:
a controller in communication with the plurality of sensors and the memory, wherein the controller is connected to a monitor, which displays a warning message after a deviation of a parameter of one of the acquired multiplicity of different physical variables from setpoint values stored in the controller is detected.

17. The axle-monitoring system as claimed in claim 1, wherein the axle-monitoring system is mounted on the trailer to be pulled by the utility vehicle.

18. The axle-monitoring system as claimed in claim 5, wherein the plurality of sensors are arranged and configured in such a way that the multiplicity of different physical variables are acquired at a central location on the chassis.

19. The axle-monitoring system as claimed in claim 1, wherein the plurality of sensors are arranged and configured in such a way that the multiplicity of different physical variables are acquired at a central location on the chassis.

* * * * *